United States Patent [19]

Levien

[11] Patent Number: 5,404,137
[45] Date of Patent: Apr. 4, 1995

[54] HIGH SPEED TRANSITION SIGNALLING COMMUNICATION SYSTEM

[76] Inventor: Raphael L. Levien, Rte. 1, Box 18, P.O. Box 31 (UPS), McDowell, Va. 24458

[21] Appl. No.: 697,863

[22] Filed: May 9, 1991

[51] Int. Cl.[6] ............................................. H04Q 1/30
[52] U.S. Cl. ........................... 340/825.07; 340/825.08; 340/825.5; 370/85.1
[58] Field of Search ...................... 340/825.07, 825.08, 340/825.16, 825.52, 825.5; 370/85.1

[56] References Cited

U.S. PATENT DOCUMENTS

| | | |
|---|---|---|
| 3,886,524 | 5/1975 | Appelt . |
| 3,993,981 | 11/1976 | Cassarino, Jr. et al. . |
| 4,085,448 | 4/1978 | Kogge ............................. 364/900 |
| 4,300,193 | 11/1981 | Bradley et al. . |
| 4,300,194 | 11/1981 | Bradley et al. . |
| 4,370,712 | 1/1983 | Johnson et al. . |
| 4,495,571 | 1/1985 | Staplin et al. . |
| 4,558,429 | 12/1985 | Barlow et al. . |
| 4,855,901 | 8/1989 | Planteline . |
| 4,962,378 | 10/1990 | Fadem ............................. 340/825.5 |
| 4,967,344 | 10/1990 | Scavezza et al. . |
| 4,969,121 | 11/1990 | Chan et al. ..................... 395/325 |

Primary Examiner—John K. Peng
Assistant Examiner—R. Gray
Attorney, Agent, or Firm—Allan Jacobson

[57] ABSTRACT

A transition signalling communication system suitable for use in a high speed data communication bus between a bus master and two or more peripheral slave devices provides data transfer rates up to twice the maximum clock frequency. The bus architecture permits transition signalling to be used with a plurality of slave devices with tri-state or open collector control signals. The bus master includes a first control signal, which initiates a data transfer request by the transition of the first control signal, and a second control signal which provides an indication whether the first control signal transition is valid. In response, the slave includes a third control signal which acknowledges the first control signal by the transition of the third control, and fourth control signal which provides an indication whether the third control signal transition is valid.

24 Claims, 7 Drawing Sheets

SIGNAL CHART

| NAME | DESCRIPTION | | TYPE | SIGNAL INDICATION | DIRECTION |
|---|---|---|---|---|---|
| CHANNEL ID | ADDR | ADDRESS | BINARY | LOGIC LEVEL | MASTER → SLAVE |
| | DIR | DIRECTION | BINARY | LOGIC LEVEL | MASTER → SLAVE |
| DATA | | DATA | TRI-STATE | LOGIC LEVEL | BI-DIRECTIONAL |
| REQ | | REQUEST | OPEN COLLECTOR | TRANSITION | MASTER → SLAVE |
| REQINVALID | | REQUEST INVALID | OPEN COLLECTOR | LOGIC LEVEL | MASTER → SLAVE |
| ACK | | ACKNOWLEDGE | OPEN COLLECTOR | TRANSITION | SLAVE → MASTER |
| ACKINVALID | | ACKNOWLEDGE INVALID | OPEN COLLECTOR | LOGIC LEVEL | SLAVE → MASTER | fig. 2 fig. 2a fig. 2b fig. 3

TWO-PHASE INPUT ADAPTER

TWO-PHASE OUTPUT ADAPTER

HIGH SPEED TRANSITION SIGNALLING COMMUNICATION SYSTEM

FIELD OF THE INVENTION

This invention relates to the field of high speed communications, and more particularly, this invention relates to a transition signalling data communications bus structure for data transfer between a central processing unit and peripheral devices.

BACKGROUND OF THE INVENTION

In a typical data bus communications system, data and address signals are placed on the data bus by the bus controller, or bus master. Thereafter a control signal indicating readiness for a data transfer is signalled to the peripheral (slave unit) device. The peripheral device may either acknowledge the transfer by an acknowledge return signal, or otherwise indicate a busy condition by a return control signal, if unable to complete the data transfer.

The control signal between master and slave units can be either an absolute logic level, or a transition signal, as is known in the prior art. Absolute logic level signalling means that a given logic level, say a logic 1, indicates a readiness to transfer data. In general, in transition signalling, the indication of readiness is the signal transition, i.e. the transition from one logic level to another, rather than the absolute logic level.

Transition signalling, as compared to logic level signalling, speeds up a data bus because twice as many operations can occur in a given time interval. That is, for a maximum signal rate of 30 Mhz for example, a maximum transfer of 30 Mhz is possible using logic level signal indication. The same limitation arises if only one edge of the control signals, i.e. the rising edge or the falling edge, is utilized. However, by using transition signalling, data can be transferred on both the rising and falling transitions of the control signals. Therefore, using transition signalling, a maximum data transfer rate of 60 Mhz is possible.

The usual way of using transition signalling for a communication channel is the two-phase interface. In a standard two-phase interface, there are two control wires and a number of data wires. The control wires are called REQ and ACK, for request and acknowledge, respectively. The REQ signal is controlled by the sender, and the ACK by the receiver. As the name suggests, the state of the communication channel is in one of two phases.

In the first phase, the REQ signal is allowed to transition, but the ACK is not. This is the "idle" phase.

In practice, the channel remains in the first phase until the sender is ready to send a word of data, at which point it places the word on the data wires and transitions REQ. This causes the channel to enter the second phase.

In the second phase, the REQ signal is not allowed to transition, but the ACK is. During this phase, one word of data is presented on the data lines.

In practice, the channel will remain in the second phase until the receiver is ready to accept the word, at which point it will transition ACK, and the channel reverts to the first phase.

The two-phase interface is very straightforward when there is communication when there is only one sender and one receiver. The present invention is an enhanced version that is usable on a bus with more than two devices.

The two-phase interface makes it straightforward to use transition signalling on a bus with only one master and one slave communicating.

However, on a bus serving three or more devices, i.e. one master unit and more than one slave device, transition signalling is considerably more difficult. In order for three or more devices to share a single control line, the logic is either tri-state or open collector. If a previous data transfer leaves a control signal in logic low condition it is difficult for another peripheral device to transition signal on that control line and force to a high condition. It is not impossible, and one way is use a capacitor on the control line. However, use of a capacitor has two problems. First, high load capacitance on the control line slows down operation considerably. Second, the circuit would be dynamic and not work down to 0 Hz, probably causing software problems.

SUMMARY OF THE INVENTION

The present invention is embodied in a high speed communication data bus structure which includes a first control for signalling an indication based upon the transition of said first control signal, and a second control signal for signalling an indication whether said first control signal transition is valid. Specifically, in the embodiment shown, when the first transition control signal is valid, the second control signal is at logic level 0, and when the first transition control signal is invalid, the second control signal is at logic level 1.

More specifically, in one embodiment of the present invention, a master control unit provides a first control signal, REQ, which by a transition signals the initiation of a data transfer. The master control unit also provides a second control signal, REQINVALID, which indicates whether the REQ signal is valid. In addition, the slave unit on the same bus includes a third control signal, ACK, which by a transition signals the acknowledgment the data transfer request, REQ, initiated by the master. The slave unit further includes a fourth control signal, ACKINVALID, for signalling an indication whether or not the ACK transition signal is valid.

To illustrate the operation of bus, it is assumed for the moment that the slave unit is ready for the data transfer and that the address on the data bus does not change. First, the master unit initiates a data transfer by placing the address on the data bus and transition signalling the REQ control line. Then, the slave unit recognizes its address, accepts the data transfer, and acknowledges the REQ signal with an ACK signal. So long as the slave unit is able to accept each data transfer, the ACKINVALID signal is low. If the slave unit cannot accept a given data word, the ACKINVALID signal is set high to indicate to the master that the slave is not ready for the data transfer. However, the ACK signal transition is still transmitted to the master, permitting the master to carry out other concurrent tasks. The master will attempt to complete the data transfer at a later time.

Then, in accordance with the present invention, the master must follow this rule: The bus address can change when the REQ control line is high, but not when the REQ control line is low. If the master unit wants to change address while the REQ control line is low, it must first bring the REQ control line high. To bring the REQ control line high, the REQINVALID line is first set high, and then the REQ line is toggled from low to high. The slave acknowledges the transition signal of the REQ line by bringing its ACK line high, while utilizing the REQINVALID line to ignore the transition of the REQ line.

Thus, a communication bus in accordance with the present invention, facilitates the use of transition signalling on a multiple user communication bus. So long as the master communicates with the same peripheral unit, data transfer can occur at a maximum rate. If the master communicates with a different slave unit each successive data transfer, there will be only half the maximum throughput. However, in most cases the master will choose to communicate a series of data transfers to the same slave unit, in which case the data transfer rate will approach the maximum data transfer rate.

DETAILED DESCRIPTION

Figure 1:
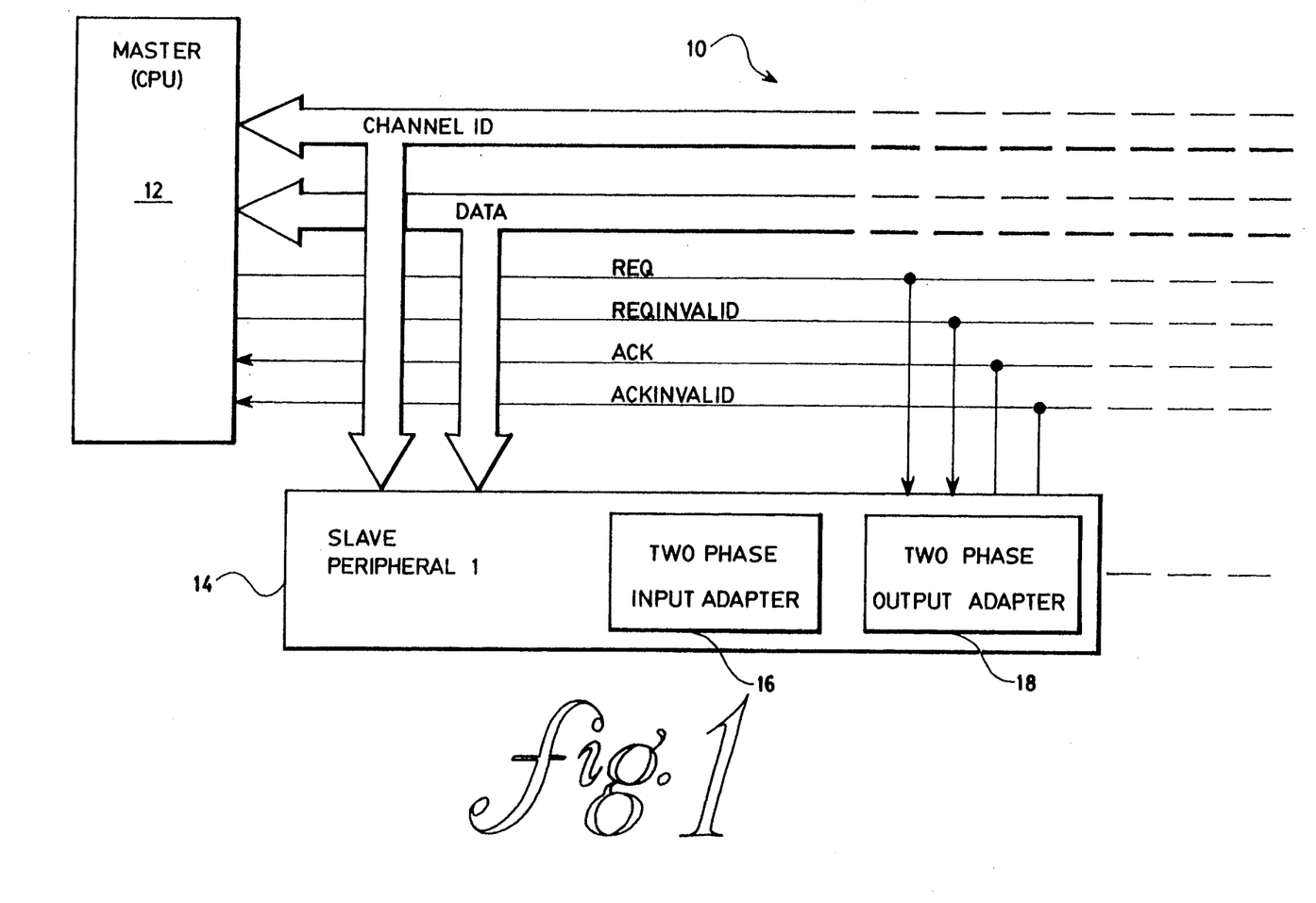
FIG. 1 is a block diagram of a high speed data communication bus in accordance with the present invention.

As shown in FIG. 1, a data communication bus 10 provides for high speed data communication between a master 12, typically a central processing unit (cpu), and a slave unit 14, typically a peripheral unit serving the central processing unit. The slave peripheral unit 14 includes a two phase input adapter 16 and two phase output adapter 18, which provide respective data input and data output interface between the bus 10 and the slave peripheral 14.

Figure 2:
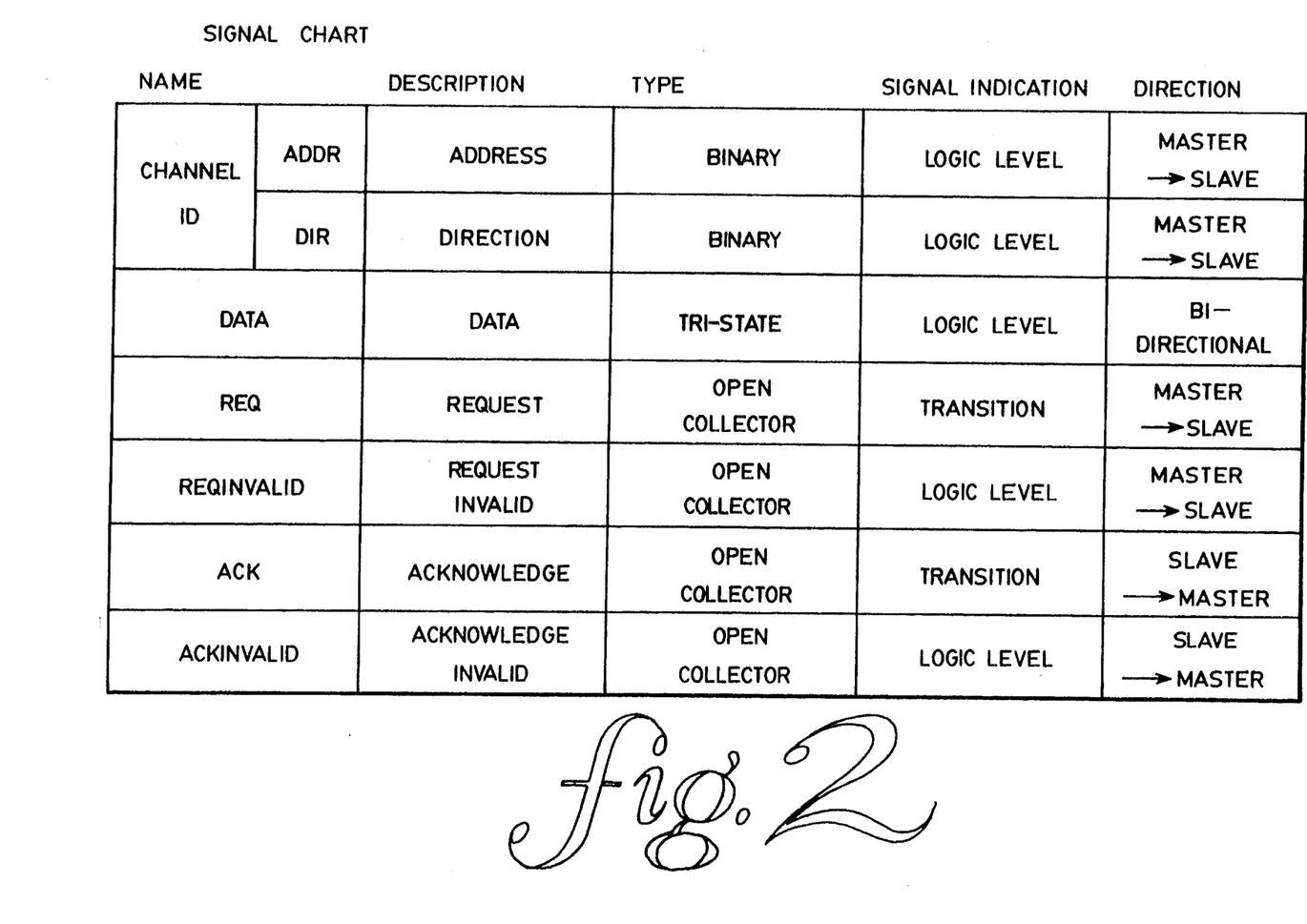
FIG. 2 is a signal chart setting forth the name, description, and signal characteristics for a high speed data communication bus in accordance with the present invention.

There are six types of communication signals illustrated in FIGS. 1 and 2. The CHANNEL ID lines, generated by the master are used to identify the communication channel. The CHANNEL ID is defined as the ADDRESS bits and the direction bit, DIR. Typically, the CHANNEL ID may contain 8 individual lines, or bits, allowing access to 256 communication channels. As indicated in FIG. 2, the CHANNEL ID includes one bit, DIR, to signify direction of the data transfer, either output or input. In such case, the remaining 7 data lines are address bits designating one of 128 channels, each of which can be used for both input and output, depending up on the state of direction control line DIR. Typically, DIR is equal to logic level low to indicate an output, and logic level high to indicate an input. The data lines are bi-directional, and can be any number of bits. Typically, the number of data lines are a multiple of 8 bits. The REQ signal, which indicates a request for a data transfer, is generated by the master. The ACK signal, which indicates acknowledgment of a request for a data transfer, is generated by the slave. The REQINVALID and ACKINVALID signals, generated by the master and slave, respectively, indicate whether a respective REQ or ACK signal is valid or invalid.

Specifically, the REQINVALID signal, which is generated by the master, is a logic 0 when the REQ signal is valid, and a logic 1 when the REQ signal is invalid. Similarly, the ACKINVALID signal, which is generated by the slave, is a logic 0 when the ACK signal is valid, and a logic 1 when the ACK signal is invalid.

As shown in the signal chart of FIG. 2, the REQ and ACK signals provide an indication by a transition between logic levels, either high to low, or low to high. The DATA lines are typically tri-state to provide for data transfer in either direction. With respect to the ACK and ACKINVALID signals, open collector drivers are used to facilitate the connection of multiple slave devices to common control lines. In the embodiment shown, the REQ and REQINVALID control lines originate from a dedicated master unit. However, to allow for the case where the bus master is not dedicated, the REQ and REQINVALID lines are open collector drivers. That is, where the bus master is not dedicated, but is selected among competing devices suitable contention mechanism, the REQ and REQINVALID lines can be open collector or tri-state so the more than one devices can share the control lines.

Figure 2A:
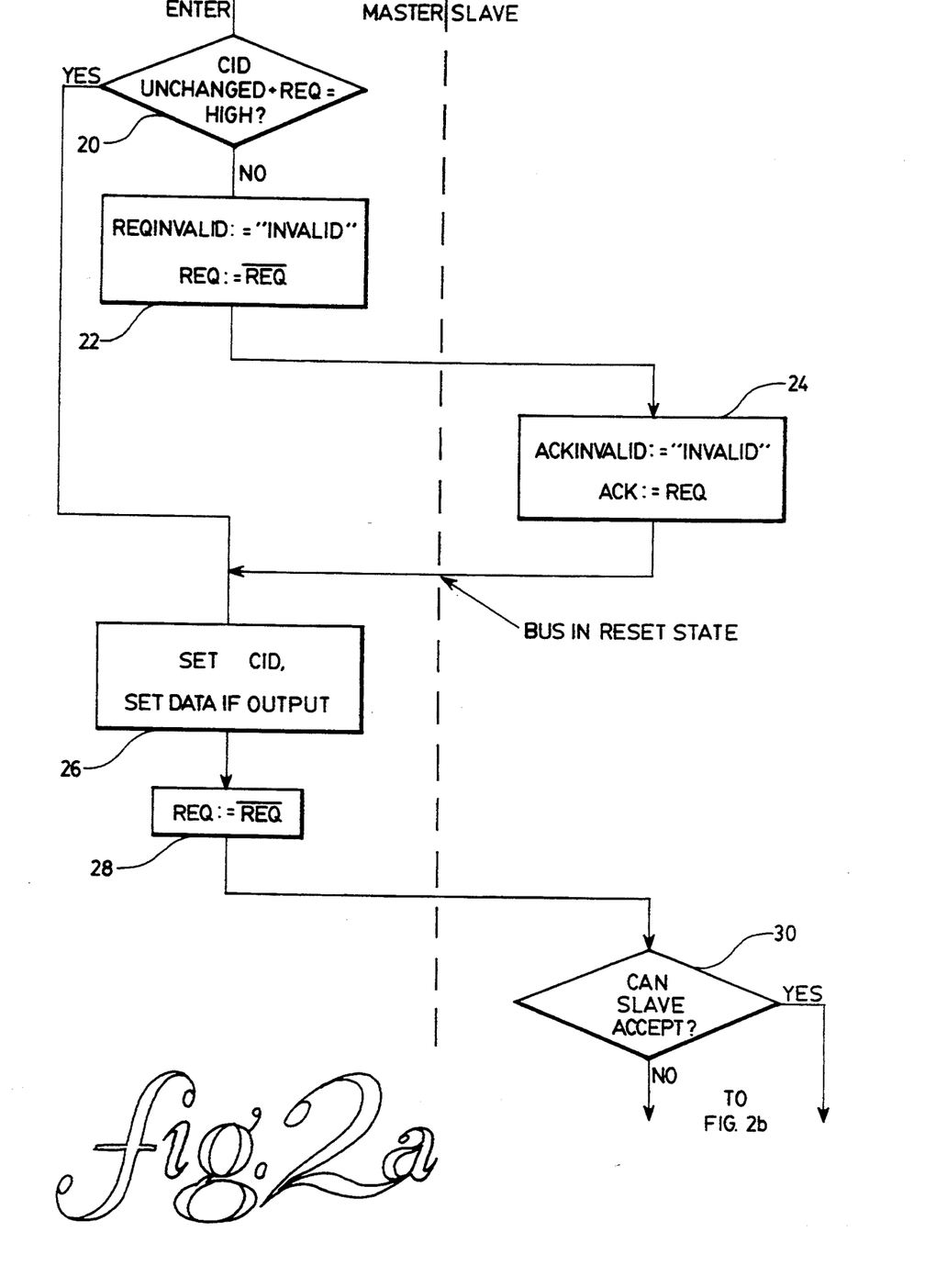
FIGS. 2A and 2B illustrate a flow chart indicating the sequence of operation of a high speed data communication bus in accordance with the present invention.
Figure 2B:
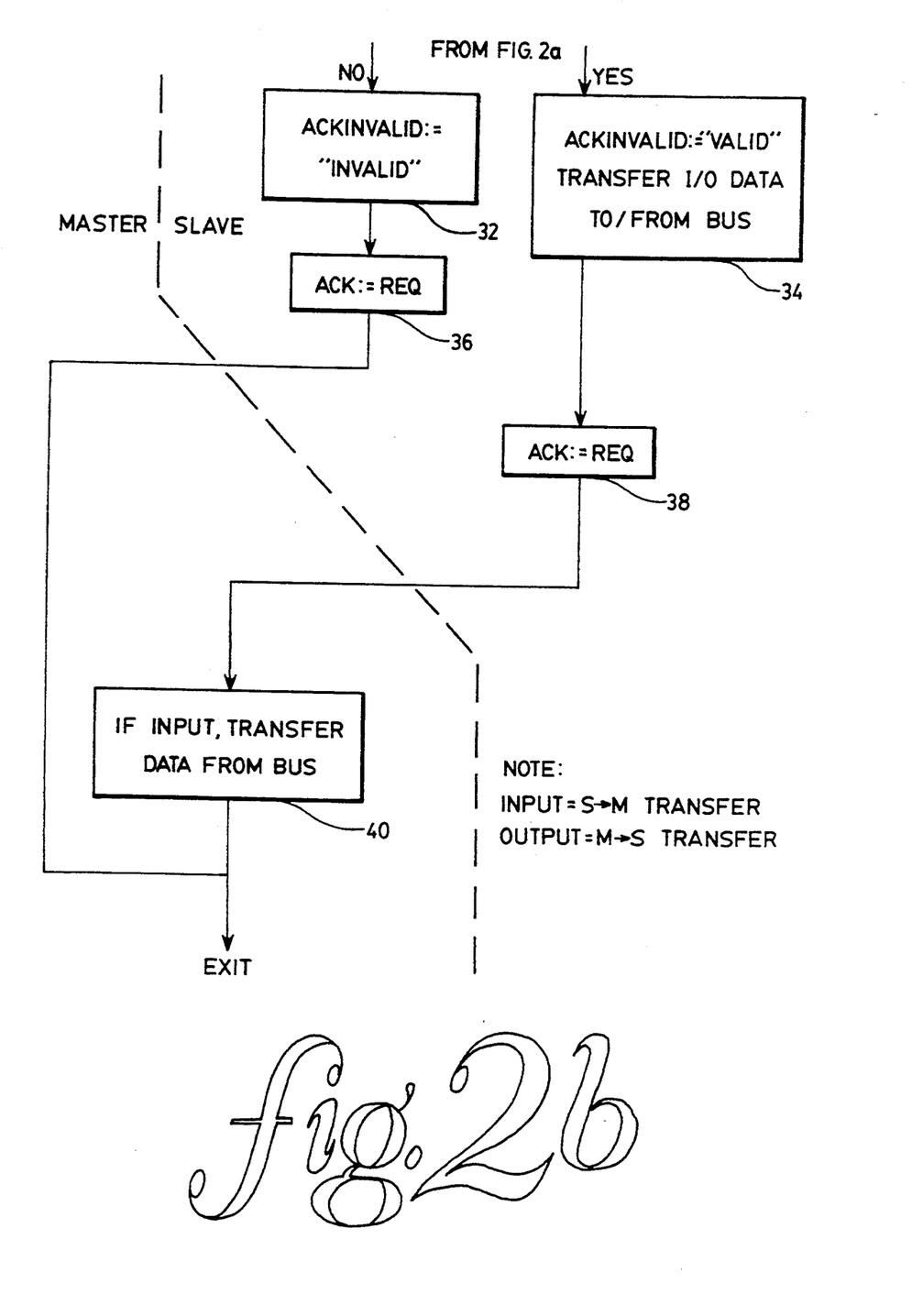

A flow chart indicating the communication sequence between master and slave units is shown in FIGS. 2A and 2B. The program is entered at step 20 whenever the master unit is to transfer data, either input or output. If the CHANNEL ID is unchanged from the last data transfer or the REQ line is high, then the master skips step 22 and proceeds to step 26 where the bus address and direction lines are set to the CHANNEL ID value, and, if the requested data transfer is a data output, then the bus DATA lines are set equal to the output data values.

Thereafter, the REQ signal is toggled to the opposite value at step 28. The transition of the REQ signal is the indication that the master is requesting a data transfer.

If, at program step 20, the CHANNEL ID had changed since the last data transfer and the REQ line is low, then the REQINVALID line is set to "invalid" and the REQ signal is toggled at step 22, i.e. from low to high. Normally, a transition of the REQ signal would indicate a data transfer request from the master to the slave. However, the slave unit responds to the REQINVALID signal being high by setting the ACKINVALID signal to high i.e. "invalid", at step 24 indicating that the returning ACK signal is to be considered invalid. Thereafter, the ACK signal is set equal to the REQ signal. Since the ACK line was previously low, the ACK transition is from low to high. The bus is now in a reset state and ready for the new data transfer initiated at steps 26 and 28.

As indicated above, the master signals a data transfer request REQ, at step 28. The slave receives the transition of the REQ signal generated at step 28 and decides whether or not it can accept the data transfer at step 30. If the data transfer cannot be accepted, the ACKINVALID line is set to "invalid" at step 32, and the ACK signal is set equal to the REQ signal at step 36. The ACK signal generated at step 36 by the slave, indicates to the master that the slave cannot accept the data transfer, and that the master can now carry out other concurrent tasks. However, the master will eventually attempt to re-initiate the data transfer at a later time.

If at step 30 the slave is able to accept the data transfer, then the ACKINVALID line is set to "valid" at step 34, and the input or output data is transferred to or from the data bus respectively. Thereafter the ACK signal is set equal to the REQ signal at step 38. The transition of the ACK signal at step 38 at a time when ACKINVALID is low, indicates to the master that the data transfer is successful. If the data transfer is an input operation, the master transfers data from the bus at step 40.

Data Output

An outline of the sequence of events for a data transfer from master to slave is given below.
1. If the CHANNEL ID is the equal to that for the last request, or if the request line is currently high, then steps 2–3 are skipped, and operation proceeds to step 4.
2. The master system sets the REQINVALID line to "invalid" and signals the REQ line (this transition is always from low to high, because of the condition in step 1).
3. The slave system signals the ACK line (this is also from low to high).
4. The master system sets the CHANNEL ID lines, sets the direction line to "output" and places the word of data on the DATA lines.
5. The master sets the REQINVALID line to "valid" and signals the REQ line.
6. The slave senses the REQ signal, and decides whether it can accept a data word on that channel. If yes, steps 7a–8a are carried out, otherwise steps 7b–9b.
7a. The slave has decided that it can accept the data word, so it latches it.
8a. The slave sets the ACKINVALID line to "valid", and signals the ACK line.
7b. The slave has decided that it cannot accept the data word, so it ignores it.
8b. The slave sets the ACKINVALID line to "invalid" and signals the ACK line.
9b. The master must later re-send this word. It can, however in the meantime, perform other tasks, and communicate on other channels.

Data Input

An outline of the sequence of events for a data transfer from slave to master is given below. 1. If the CHANNEL ID is the equal to that for the last request, or if the request line is currently high, then steps 2–3 are skipped, and operation proceeds to step 4.
2. The master system sets the REQINVALID line to "invalid" and signals the REQ line (this transition is always from low to high, because of the condition in step 1).
3. The slave system signals the ACK line (this is also from low to high).
4. The master sets the CHANNEL ID lines, and sets the direction line to "input".
5. The master sets the REQINVALID line to "valid" and signals the REQ line.
6. The slave senses the REQ signal, and decides whether it has a word available on that channel. If yes, steps 7a–8a are carried out, otherwise steps 7b–9b.

7a. The slave sets the DATA lines for the data that is to be transferred, and sets the ACKINVALID line to "valid".
8a. The slave signals the ACK line.
7b. The slave sets the ACKINVALID line to "invalid".
8b. The slave signals the ACK line.

Failsafe timer

A failsafe timer, to prevent the bus from coming to a halt when a peripheral unit fails to signal ACK through malfunction or absence, would function as follows:
1. The REQ line would signal, starting the time-out clock.
2. If the ACK line signalled before the time-out clock timed out, then the operation of the bus was normal, and the watchdog timer returns to waiting for step 1.
3. Otherwise, the watchdog sets the ACKINVALID line to "invalid" and signals ACK.
4. Then, the watchdog timer returns to step 1.

FIGS. 2a and 2b represent the programming performed in the master as well as the programming performed in the slave. The portion of the flow chart of FIGS. 2a and 2b to the left of the dotted line is carried out by the master unit. Similarly, the portion of the flow chart of FIGS. 2a and 2b to the right half of the dotted line is carried out by the slave unit. Since the master unit is typically a central processing unit of a computer system, it is desirable that the program for the operation of the bus be embodied in microcode. An input or output operation by the bus master would then be accomplished in a single instruction of the main processing unit. The following program fragments, expressed in a pseudo code, similar to the Pascal programming language, may be used to implement super input or super output instructions for use on the communication bus of the present embodiment.

In order to output value x to channel c,

```
done:= false
while not done do
    take semaphore for ports
    if c <> oldc and REQ is low then
        output "invalid" to REQINVALID port
        REQ:= not REQ
        output REQ to REQ port
    end if
    oldc:= c
    output c to CHANNEL ID port
    output x to DATA port
    output "valid" - to REQINVALID
    REQ:= not REQ
    output REQ to REQ port
    oldACK:= ACK
    while oldACK = ACK do
        input ACK from ACK port
    end while
    input ACKINVALID from ACKINVALID port
    release semaphore for ports
    if "invalid" then
        spend some time on other concurrent tasks
    else
        done:= true
    end if
end while
```

In order to input value from channel c into variable x,

```
done:= false
```

```
while not done do
    take semaphore for ports
    if c <> oldc and REQ is low then
        output "invalid" to REQINVALID port
        REQ:= not REQ
        output REQ to REQ port
    end if
    oldc:= c
    output c to CHANNEL ID port
    REQ:= not REQ
    output "valid" to REQINVALID port
    output REQ to REQ port
    oldACK:= ACK
    while oldACK = ACK do
        input ACK from ACK port
    end while
    input x from DATA port
    input ACKINVALID from ACKINVALID port
    release semaphore for ports
    if "invalid" then
        spend some time on other concurrent tasks
    else
        done:= 1
    end if
end while
```

Figure 3:
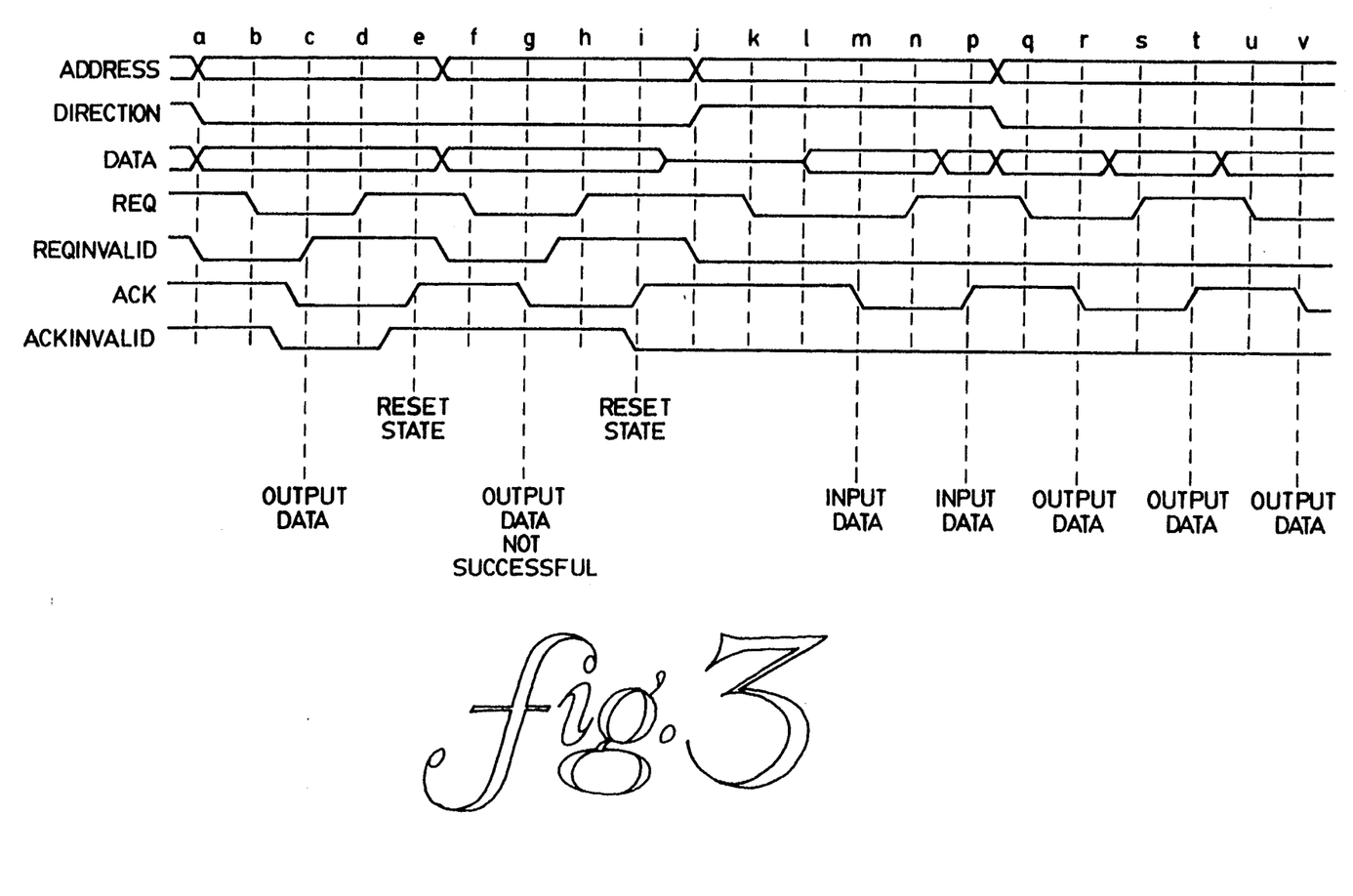
FIG. 3 is timing diagram illustrating the waveform of the signals described in the signal chart of FIG. 2.

A timing diagram illustrating the operation of the communication bus is shown in FIG. 3. To output data, the master sets the CHANNEL ID onto the address and direction lines at time A. Also at time A, the master places the data onto the DATA lines. Then, at time B, the master signals REQ by toggling the current value of REQ (high) to the opposite value (low). Then, at time C, the slave sets ACKINVALID equal to "valid", and signals back to the master indicating that the transfer was successful by a transition of the ACK signal (also from high to low).

The next data transfer over the bus is to a different device, i.e. to a different address. However, at time C, the REQ and the ACK signal are low. When the ACK signal is low, the next device at the new address will not be able to easily bring the ACK line high because the former device which shares the ACK line, is holding it low. In order to bring the bus into a state where it can communicate with the second peripheral device, the master sets the REQINVALID line to "invalid" and toggles the REQ line from low to high at time D. In response, the slave sets its ACKINVALID line to "invalid" and toggles the ACK line from low to high at time E. The bus is now in a reset state.

From a reset state, the bus can proceed to initiate an output data transfer. New address and data are placed on the ADDRESS, DIR and DATA lines at time F. For purposes of illustration, the slave device is assumed to be busy or otherwise not ready to accept data at time F, and communicates such condition by setting the ACKINVALID high to "invalid". Therefore, at time G when the slave device signals its ACK line, the ACKINVALID is indicating to the master that the second peripheral device could not accept the output data. The master will later attempt to re-transmit the output data. In the meantime, the master is free to work on other concurrent tasks.

The next data transfer over the bus is a data input from a different device. Since the REQ line and the ACK line just after point G are low, it is necessary to bring the bus to a reset conditions at time I, in the same manner as the bus was reset at time E. The new address is placed on the ADDRESS lines at time J, at which point the direction of data transfer DIR, is changed from output to input. The master signals a request, REQ at time K, and the designated slave unit places data on the DATA lines at time L. Thereafter, the slave unit provides an ACK transaction at time M in response to which data is input to the master.

The description of the operation of the communication bus from time A to time M illustrates the operation of the data bus when the CHANNEL ID changes and the REQ line is low in between consecutive data transfers. Under the illustrated conditions thus far, the operation of the data bus is somewhat slower because of the need to condition the bus into a reset state between data transfers. However, so long as the CHANNEL ID remains the same or REQ line is high (even if the CHANNEL ID changes), then there is no need to reset the data bus, and the data transfer rate can continue at full bus speed.

Specifically, since the address at time M and time P is the same, it is only necessary to toggle the REQ line at time N and the ACK line at time P to achieve a data transfer even though the condition of the REQ line was initially low prior to time N.

Similarly, in between time P and time R it is desired to switch to a different CHANNEL ID including a different direction of data transfer. However, since the REQ line is in a high condition at time P, it is only necessary to toggle the REQ line at time Q in order to achieve such data output transfer.

Subsequent data transfers to the same peripheral device occur at time T and V as a result of output data being placed on the DATA lines, and transition signals of the REQ line at time S and U respectively. It is noted that the REQ "invalid" and ACK "invalid" lines are low, indicating a "valid" condition for all of the data transfers between time M and time V. The communication bus operates at a maximum data rate from time M through time V.

As described above the interface between the central processing unit and the bus is best embodied in a microcoded instruction set for super input and output. The interface between the peripheral unit and the data bus may be implemented by the use of a two phase input adaptor 16 and a two phase output adaptor 18 as shown in block form in FIG. 1.

Figure 4A:
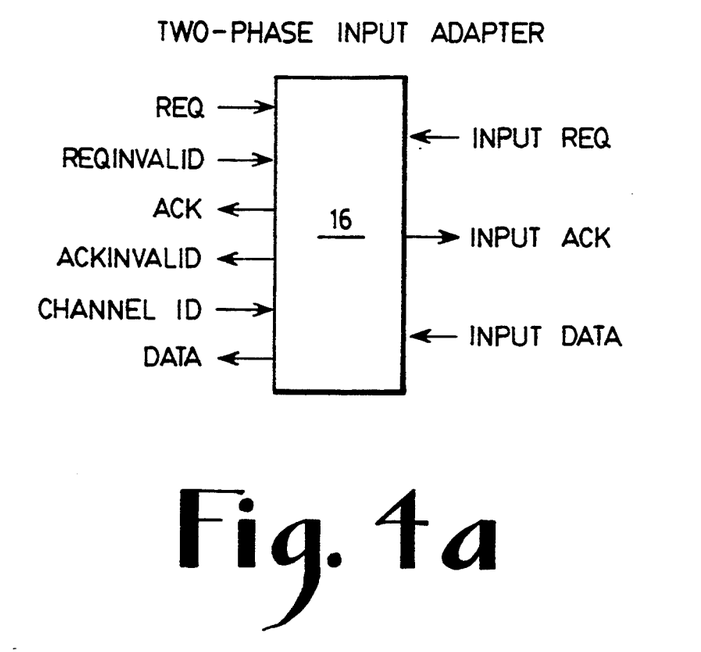
FIG. 4A is a two phase input adapter for an input data interface in accordance with the present invention.
Figure 4B:
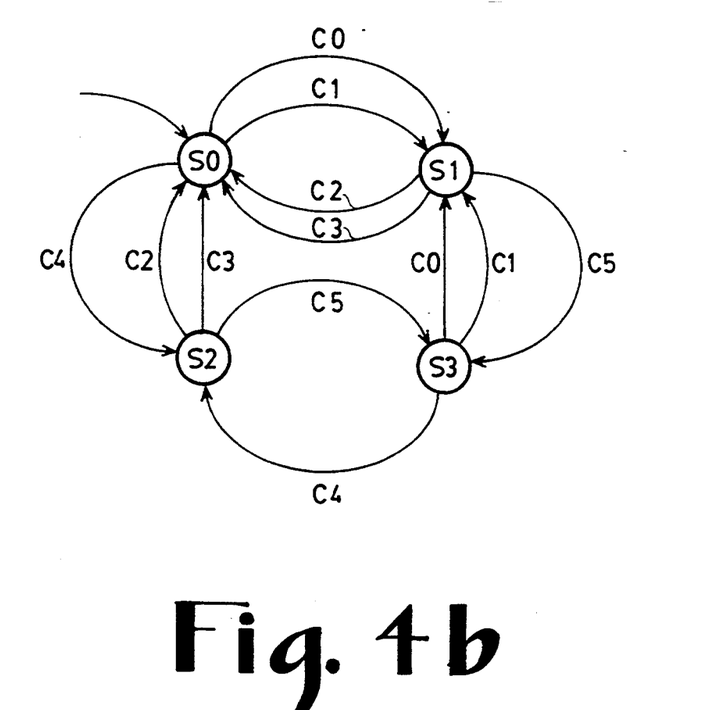
FIG. 4B is a state transition diagram for an embodiment of the two phase input adapter illustrated in block form in FIG. 4A.

An embodiment of the two phase input adaptor of FIG. 4A is illustrated by the finite state transition diagram of FIG. 4B. As shown in the state transition diagram of FIG. 4B, the two phase input adaptor 16 includes an initial state S0, and three other internal states S1, S2 and S3. Transitions between the four states is governed by transition control signals C0, C1, C2, C3, C4, and C5. For each of the logic equations given in Table 1 below the indicated transition Table 1 takes place when the logical value given by the equations in FIG. 4 indicate a true condition. Also at that time, when one of the conditions C0 through C5 become true, the lines to the right of the arrow indicate the desired operation of the interface with respect to the data bus. For example, when condition C0 in Table 1 is true, the expression to the right of the arrow i.e., "data:=input data" means that the value of the data on the communication bus DATA lines is latched to the data of the two phase input adaptor.

TABLE I

Figure 5A:
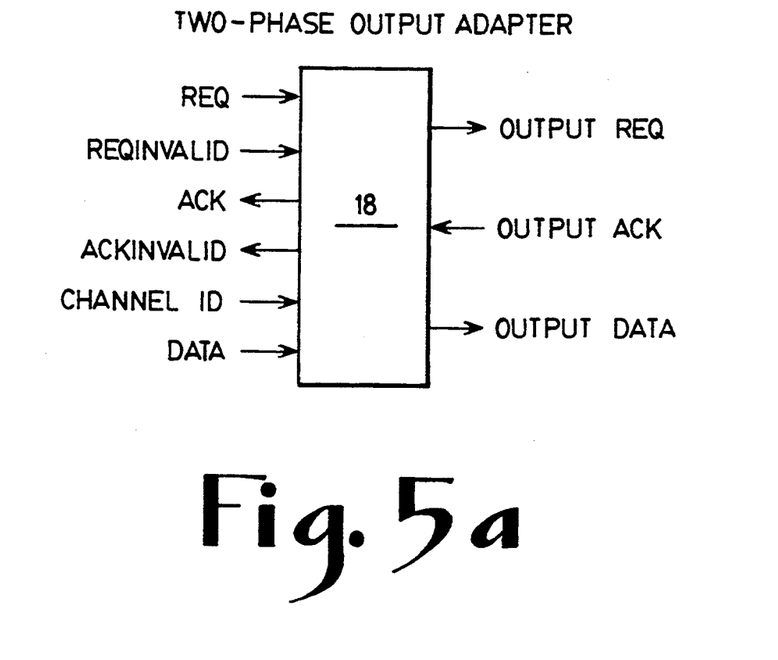
FIG. 5A is a two phase output adapter for an output data interface in accordance with the present invention.

C0 = $\overline{REQ} \cdot \overline{REQINVALID} \cdot$ CHANNEL ID =
SLAVE ID $\cdot \overline{(INPUT\ REQ \oplus INPUT\ ACK)}$
→DATA: = INPUT DATA; INPUT ACK: = INPUT REQ
→ACKINVALID: = FALSE; ACK: = REQ C1 = $\overline{REQ} \cdot$ (REQINVALID + (INPUT REQ⊕INPUT ACK))
CHANNEL ID = SLAVE ID
→ACKINVALID: = TRUE; ACK: = REQ C2 = REQ $\cdot \overline{REQINVALID} \cdot$ CHANNEL ID = SLAVE ID $\cdot$
$\overline{(INPUT\ REQ \oplus INPUT\ ACK)}$
→DATA: = INPUT DATA; INPUT ACK: = INPUT REQ
→ACKINVALID: = FALSE; ACK: = REQ C3 = REQ $\cdot$ (REQINVALID + (INPUT REQ ⊕ INPUT ACK))
CHANNEL ID = SLAVE ID
→ACKINVALID: = TRUE; ACK: = REQ C4 = $\overline{REQ} \cdot$ CHANNEL ID ≠ SLAVE ID→  ACKINVALID: = TRUE
                                              DATA: = TRI-STATE C5 = REQ $\cdot$ CHANNEL ID ≠ SLAVE ID→  ACKINVALID: = TRUE
                                        DATA: = TRI-STATE Similarly, an embodiment of the two phase output adaptor of FIG. 5A is illustrated by the finite state transition diagram of FIG. 5B. As shown in the state transition diagram of FIG. 5B, the two phase output adaptor 18 includes an initial state S0, and three other internal states S1, S2 and S3. Transitions between the four states is governed by transition control signals C0, C1, C2, C3, C4, and C5. For each of the logic equations given in Table 2 below, the indicated transition Table 2 takes place when the logical value given by the equations in Table 2 indicate a true condition. Also at that time, when one of the conditions C0 through C5 become true, the lines to the right of the arrow indicate the desired operation of the interface with respect to the data bus. For example, in Table 2 when transition signal C0 is true, the term to the right of the arrow, i.e. "output REQ:=not output REQ" means that the REQ line toggles to the opposite value.

TABLE II

Figure 5B:
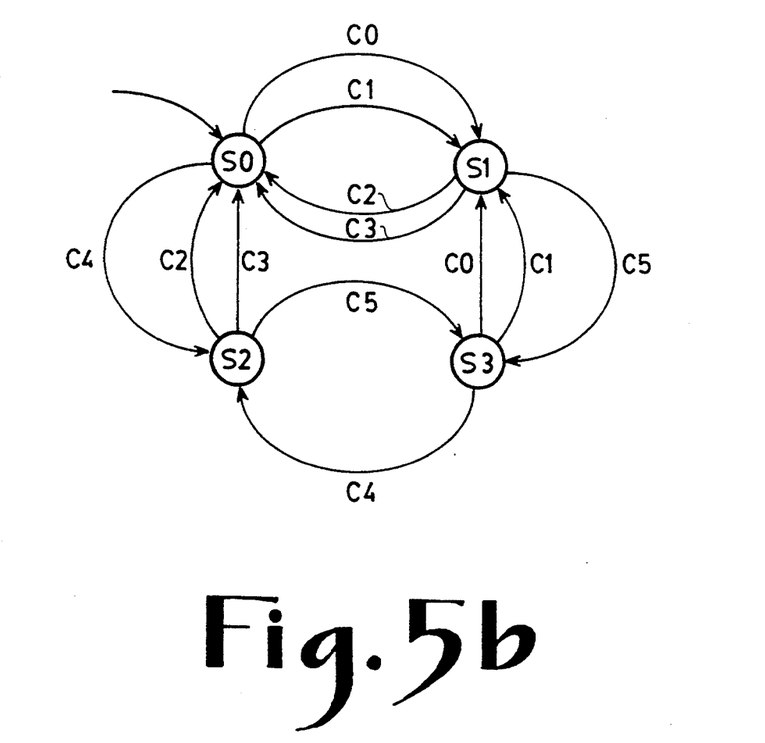
FIG. 5B is a state transition diagram for an embodiment of the two phase output adapter illustrated in block form in FIG. 5A.

C0 = $\overline{REQ} \cdot \overline{REQINVALID} \cdot$ CHANNEL ID =
SLAVE ID $\cdot \overline{(OUTPUT\ ACK \oplus OUTPUT\ REQ)}$
→OUTPUT DATA: = DATA; OUTPUT REQ: = $\overline{OUTPUT\ REQ}$
→ACKINVALID: = FALSE; ACK: = REQ C1 = $\overline{REQ} \cdot$ (REQINVALID + (OUTPUT ACK ⊕ OUTPUT REQ)) $\cdot$
CHANNEL ID = SLAVE ID
→ACKINVALID: = TRUE; ACK: = REQ C2 = REQ $\cdot \overline{REQINVALID} \cdot$ CHANNEL ID = SLAVE ID $\cdot$
$\overline{(OUTPUT\ ACK \oplus OUTPUT\ REQ)}$
→OUTPUT DATA: = DATA; OUTPUT REQ: = $\overline{OUTPUT\ REQ}$
→ACKINVALID: = FALSE; ACK: = REQ C3 = REQ $\cdot$ (REQINVALID + (OUTPUT ACK ⊕ OUTPUT REQ)) $\cdot$
CHANNEL ID = SLAVE ID
→ACKINVALID: = TRUE; ACK: = REQ C4 = $\overline{REQ} \cdot$ CHANNEL ID ≠ SLAVE ID→ACKINVALID: = TRUE C5 = REQ $\cdot$ CHANNEL ID ≠ SLAVE ID→ACKINVALID: = TRUE The input adaptor 16 and two phase output adaptor 18 may be implemented by one skilled in the art using custom logic, programmable logic arrays or a general purpose embedded programmable microprocessor.

The input adaptor interfaces to the bus of the present invention, and also acts as a receiver in the standard two-phase interface, as described above. The output adaptor interfaces to the present bus, and also acts as a sender for the standard two-phase interface.

What is claimed is:
1. In a transition signal data communication system, a method for transferring data between a master and a slave unit, said method comprising:
providing a first control signal from said master unit for signalling an indication based on the transition between two logic states of said first control signal;
providing a second control signal from said master unit for signalling an indication prior to said first control signal indication, whether said first control signal transition is valid;
providing a third control signal from said slave unit, responsive to said first control signal, for signalling an indication based on the transition between two logic states of said third control signal; and
providing a fourth control signal from said slave unit for signalling an indication prior to said third control signal indication, whether said third control signal transition is valid.

2. In a master unit of a transition signal data communication system, a method for transferring data between said master and a slave unit, said method comprising:
providing a first control signal from said master unit for signalling an indication based on the transition between two logic states of said first control signal; and
providing a second control signal from said master unit for signalling an indication prior to said first control signal indication, whether said first control signal transition is valid.

3. In a slave unit of a transition signal data communication system including a master unit providing a first control signal for signalling an indication based on the transition between two logic states of said first control signal and providing a second control signal for signalling an indication prior to said first control signal indication, whether said first control signal transition is valid, a method for transferring data between said master and slave unit comprising:
providing a third control signal from said slave unit, responsive to said first control signal from said master unit, for signalling an indication based on the transition between two logic states of said third control signal; and
providing a fourth control signal from said slave Unit, for signalling an indication prior to said third control signal indication, whether said fourth control signal transition is valid.

4. A method in accordance with claim 3, further comprising:
transferring data between said master and slave unit responsive to said third control signal, if said fourth control signal indicates that said third control signal is valid.

5. In a transition signal data communication system, a method for transferring data between a master and a slave unit, said method comprising:
providing from said master, a first control signal for indicating a request to initiate a data transfer;
providing from said master, a second control signal for indicating prior to said first control signal indication, whether said first control signal transition is valid;
providing from said slave, a third control signal for indicating an acknowledgment of said request to initiate a data transfer; and
providing from said slave, a fourth control signal for indicating prior to said third control signal indication, whether said third control signal is valid.

6. In a master unit of a transition signal data communication system, a method for transferring data between said master and a slave unit, said method comprising:
providing from said master, a first control signal for indicating a request to initiate a data transfer; and
providing from said master, a second control signal for indicating prior to said first control signal indication, whether said first control signal transition is valid.

7. In a slave unit of a transition signal data communication system, including a master unit providing a first control signal for indicating a request to initiate a data transfer, and providing a second control signal for indicating prior to said first control signal indication, whether said first control signal transition is valid, a method for transferring data between said master and said slave unit comprising:
providing from said slave, a third control signal for indicating an acknowledgment of said request to initiate a data transfer; and
providing from said slave, a fourth control signal for indicating prior to said third control signal indication, whether said third control signal is valid.

8. A method in accordance with claim 7, further comprising:
transferring data between said master and slave unit responsive to said third control signal, if said fourth control signal indicates that said third control signal is valid.

9. In a transition signal data communication system, an apparatus for transferring data between a master and a slave unit, said apparatus comprising:
means for providing a first control signal from said master unit for signalling an indication based on the transition between two logic states of said first control signal;
means for providing a second control signal from said master unit for signalling an indication prior to said first control signal indication, whether said first control signal transition is valid;
means for providing a third control signal from said slave unit, responsive to said first control signal for signalling an indication based on the transition between two logic states of said third control signal; and
means for providing a fourth control signal from said slave unit for signalling an indication prior to said third control signal indication, whether said third control signal transition is valid.

10. In a master unit of a transition signal data communication system, an apparatus for transferring data between said master and a slave unit, said apparatus comprising:
means for providing a first control signal from said master unit for signalling an indication based on the transition between two logic states of said first control signal; and
means for providing a second control signal from said master unit for signalling an indication prior to said first control signal indication, whether said first control signal transition is valid.

11. In a slave unit of a transition signal data communication system including a master unit providing a first control signal for signalling an indication based on the transition between two logic states of said first control signal and providing a second control signal for signalling an indication prior to said first control signal indication, whether said first control signal transition is valid, an apparatus for transferring data between said master and slave unit comprising:
means for providing a third control signal from said slave unit, responsive to said first control signal from said master unit, for signalling an indication based on the transition between two logic states of said third control signal; and
means for providing a fourth control signal from said master unit for signalling an indication prior to said third control signal indication, whether said third control signal transition is valid.

12. An apparatus in accordance with claim 11, further comprising:
means for transferring data between said master and slave unit responsive to said third control signal, if said fourth control signal indicates that said third control signal is valid.

13. In a transition signal data communication system, an apparatus for transferring data between a master and a slave unit, said apparatus comprising:

means for providing from said master, a first control signal for indicating a request to initiate a data transfer;

means for providing from said master, a second control signal for indicating prior to said first control signal indication, whether said first control signal is valid;

means for providing from said slave, a third control signal for indicating an acknowledgment of said request to initiate a data transfer; and means for providing from said slave, a fourth control signal for indicating prior to said third control signal indication, whether said third control signal is valid.

14. In a master unit of a transition signal data communication system, an apparatus for transferring data between said master and a slave unit, said apparatus comprising:

means for providing from said master, a first control signal for indicating a request to initiate a data transfer; and means for providing from said master, a second control signal for indicating prior to said first control signal indication, whether said first control signal is valid.

15. In a slave unit of a transition signal data communication system, including a master unit providing a first control signal for indicating a request to initiate a data transfer, and providing a second control signal for indicating prior to said first control signal indication, whether said first control signal is valid, an apparatus for transferring data between said master and said slave unit comprising:

means for providing from said slave, a third control signal for indicating an acknowledgment of said request to initiate a data transfer; and means for providing from said slave, a fourth control signal for indicating prior to said third control signal indication, whether said third control signal is valid.

16. An apparatus in accordance with claim 15, further comprising:

means for transferring data between said master and slave unit responsive to said third control signal, if said fourth control signal indicates that said third control signal is valid.

17. In a transition signal data communication system, a method for transferring data between a master and a plurality of slave units, each of said master and plurality of slave units being coupled to a common address bus, said method comprising:

providing a first control signal from said master, for signalling an indication to transfer data based on the transition between first and second logic states of said first control signal;

providing a second control signal from said master, for signalling an indication prior to said first control signal indication, whether said first control signal transition is valid;

providing an address from said master on said common address bus corresponding to one of said plurality of slave units;

providing a third control signal from said one of said slave units corresponding to said address, responsive to said first control signal for signalling an indication to acknowledge said data transfer data based on the transition between first and second logic states of said third control signal;

providing a fourth control signal from said one of said slave units, for signalling an indication prior to said third control signal indication, whether said third control signal transition is valid; and changing said address on said common address bus to correspond to a second one of said plurality of slave units only when said first control signal is in said first logic state.

18. In a master unit of a transition signal data communication system, a method for transferring data between a master and a plurality of slave units, each of said master and plurality of slave units being coupled to a common address bus, said method comprising:

providing a first control signal from said master, for signalling an indication to transfer data based on the transition between first and second logic states of said first control signal;

providing a second control signal from said master, for signalling an indication prior to said first control signal indication, whether said first control signal transition is valid;

providing an address from said master on said common address bus corresponding to one of said plurality of slave units; and changing said address on said common address bus to correspond to a second one of said plurality of slave units only when said first control signal is in said first logic state.

19. In a slave unit of a transition signal data communication system, including a master and a plurality of slave units being coupled to a common address bus, a method for transferring data between said master and one of said plurality of slave units, said master providing an address on said common address bus corresponding to said one of said plurality of slave units, and providing a first control signal for signalling an indication to transfer data based on the transition between first and second logic states of said first control signal, and providing a second control signal for signalling whether said first control signal transition is valid, said master changing said address on said common address bus to correspond to a second one of said plurality of slave units only when said first control signal is in said first logic state, said method comprising:

providing a third control signal from said one of said slave units corresponding to said address, responsive to said first control signal for signalling an indication to acknowledge said data transfer data based on the transition between first and second logic states of said third control signal; and providing a fourth control signal from said one of said slave units, for signalling an indication whether said third control signal transition is valid.

20. A method in accordance with claim 19, further comprising:

transferring data between said master and slave unit responsive to said first control signal and third control signal, if said second control signal indicates that said first control signal is valid and said fourth control signal indicates that said third control signal is valid.

21. In a transition signal data communication system, an apparatus for transferring data between a master and a plurality of slave units, each of said master and plurality of slave units being coupled to a common address bus, said apparatus comprising:

means for providing a first control signal from said master, for signalling an indication to transfer data based on the transition between first and second logic states of said first control signal;

means for providing a second control signal from said master, for signalling prior to said first control signal indication, whether said first control signal transition is valid;

means for providing an address from said master on said common address bus corresponding to one of said plurality of slave units;

means for providing a third control signal from said one of said slave units corresponding to said address, responsive to said first control signal for signalling an indication to acknowledge said data transfer data based on the transition between first and second logic states of said third control signal;

means for providing a fourth control signal from said one of said slave units, for signalling an indication prior to said third control signal indication, whether said third control signal transition is valid; and means for changing said address on said common address bus to correspond to a second one of said plurality of slave units only when said first control signal is in said first logic state.

22. In a master unit of a transition signal data communication system, an apparatus for transferring data between a master and a plurality of slave units, each of said master and plurality of slave units being coupled to a common address bus, said apparatus comprising:

means for providing a first control signal from said master, for signalling an indication to transfer data based on the transition between first and second logic states of said first control signal;

means for providing a second control signal from said master, for signalling an indication prior to said first control signal indication, whether said first control signal transition is valid;

means for providing an address from said master on said common address bus corresponding to one of said plurality of slave units; and means for changing said address on said common address bus to correspond to a second one of said plurality of slave units only when said first control signal is in said first logic state.

23. In a slave unit of a transition signal data communication system, including a master and a plurality of slave units being coupled to a common address bus, an apparatus for transferring data between said master and one of said plurality of slave units, said master providing an address on said common address bus corresponding to said one of said plurality of slave units, and providing a first control signal for signalling an indication to transfer data based on the transition between first and second logic states of said first control signal, and providing a second control signal for signalling whether said first control signal transition is valid, said master changing said address on said common address bus to correspond to a second one of said plurality of slave units only when said first control signal is in said first logic state, said apparatus comprising:

means for providing a third control signal from said one of said slave units corresponding to said address, responsive to said first control signal for signalling an indication to acknowledge said data transfer data based on the transition between first and second logic states of said third control signal; and means for providing a fourth control signal from said one of said slave units, for signalling an indication whether said third control signal transition is valid.

24. An apparatus in accordance with claim 23, further comprising:

means for transferring data between said master and slave unit responsive to said first control signal and third control signal, if said second control signal indicates that said first control signal is valid and said fourth control signal indicates that said third control signal is valid.

* * * * *